(12) United States Patent
Danree et al.

(10) Patent No.: US 9,578,019 B2
(45) Date of Patent: Feb. 21, 2017

(54) METHOD AND SYSTEM FOR MANAGING AN EMBEDDED SECURE ELEMENT ESE

(71) Applicant: OBERTHUR TECHNOLOGIES, Colombes (FR)

(72) Inventors: Arnaud Danree, Colombes (FR); Guillaume Larignon, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 263 days.

(21) Appl. No.: 14/100,307

(22) Filed: Dec. 9, 2013

(65) Prior Publication Data

US 2014/0164771 A1 Jun. 12, 2014

(30) Foreign Application Priority Data

Dec. 10, 2012 (FR) ...................... 12 61829

(51) Int. Cl.
| | |
|---|---|
| *H04L 29/00* | (2006.01) |
| *H04L 29/06* | (2006.01) |
| *H04W 12/04* | (2009.01) |
| *H04L 9/32* | (2006.01) |
| *H04W 4/00* | (2009.01) |

(52) U.S. Cl.
CPC ......... *H04L 63/0853* (2013.01); *H04L 9/3271* (2013.01); *H04L 63/04* (2013.01); *H04L 63/062* (2013.01); *H04W 12/04* (2013.01); *H04L 2209/805* (2013.01); *H04W 4/003* (2013.01)

(58) Field of Classification Search
CPC .................................. G06F 12/00; H04L 9/32
USPC ........................................................ 713/170
See application file for complete search history.

(56) References Cited

U.S. PATENT DOCUMENTS

| | | | |
|---|---|---|---|
| 8,621,168 B2* | 12/2013 | von Behren | ....... G06Q 20/3552 711/152 |
| 2012/0238206 A1 | 9/2012 | Singh et al. | |
| 2013/0159710 A1* | 6/2013 | Khan | ................. H04L 63/062 713/168 |

FOREIGN PATENT DOCUMENTS

EP 2453377 5/2012

OTHER PUBLICATIONS

French Search Report dated May 3, 2013, corresponding to the Foreign Priority Application No. 1261829.

(Continued)

*Primary Examiner* — Brandon Hoffman
*Assistant Examiner* — Michael D Anderson
(74) *Attorney, Agent, or Firm* — Young & Thompson (57) ABSTRACT

A method and system for managing an embedded secure element (50) accessible as a slave of the resident applications (App1-3) of a host device of the eSE. The eSE includes an issuer security domain (51), ISD, with which cryptographic keys are associated. The method includes, in an application agent embedded in an OS of the host device: sending (420) the ISD a random value; receiving (435) a cryptogram corresponding to the random value encrypted using a key associated with the ISD; sending (440, 450) the random value and the cryptogram to a first extern entity entered in the application agent. The method includes: sending (455, 4555) the random value and the cryptogram from the first entity to a second external entity; verifying (4556) that the second entity possesses keys associated with the ISD from the cryptogram and the random value.

18 Claims, 7 Drawing Sheets

(56) References Cited

OTHER PUBLICATIONS

V. Alimi, et al.; "Post-Distribution Provisioning and Personalization of a Payment Application on a UICC-Based Secure Element"; Mar. 16, 2009; pp. 701-705.

* cited by examiner

Figure 4 (continuation)

METHOD AND SYSTEM FOR MANAGING AN EMBEDDED SECURE ELEMENT ESE

FIELD OF THE INVENTION

The invention relates to the field of embedded secure elements (eSE), and more particularly a method for managing such embedded secure elements, and a corresponding system.

BACKGROUND OF THE INVENTION

Several types of secure elements are known to be used in host devices such as mobile terminals, smartphones, digital tablets, etc.

A first type is known under the name UICC (Universal Integrated Circuit Card), set out in the standard ETSI SP 102 221 and includes conventional smartcards, SIM cards (or USIM—Universal Subscriber Identity Module), as well as security tokens.

A second type, which is of interest for the present invention, is known under the name "embedded secure element" or eSE and set out in the "GlobalPlatform Card Specification Version 2.2.1" standard relative to the GlobalPlatform technology.

These two types of secure elements have internal safety means or mechanisms to ensure the integrity and security of sensitive data and sensitive services that they host.

One essential difference between these two types of secure elements lies in the autonomy that they have to establish a connection with remote equipment, typically an OTA (Over-The-Air) server outside the host device.

The UICC card has master means in establishing such a connection. In other words, an application of the UICC card may take the initiative to create such an establishment, for example using available capacities in the host device (for example the SIM ToolKits tools). The UICC card is said to be a "connected" secure element.

A UICC card can, at its own initiative, send an SMS message to an OTA server to initiate such a connection. By way of example, publication EP 2,453,377 describes a UICC whereof an administrator can manage an OTA server using an HTTP connection.

The embedded secure element eSE is, meanwhile, a slave element of applications residing on the host device, i.e., a slave in a master-slave relationship in the upper layers of the OSI model, in particular in the application layer (layer 7), or in layers 5 and 6. Thus, establishing a connection with the outside requires an application residing on the host device, which is the only one to take the initiative in the establishment. It is that application that decides to connect the eSE to an external server.

As an example, the eSE can form the secure element necessary for many uses or services based on a NFC (Near Field Communication) implemented by a host mobile terminal. For example, an NFC payment service requires secret banking information from the user that is advantageously stored in the eSE, sheltered from any untimely access.

Figure 1:
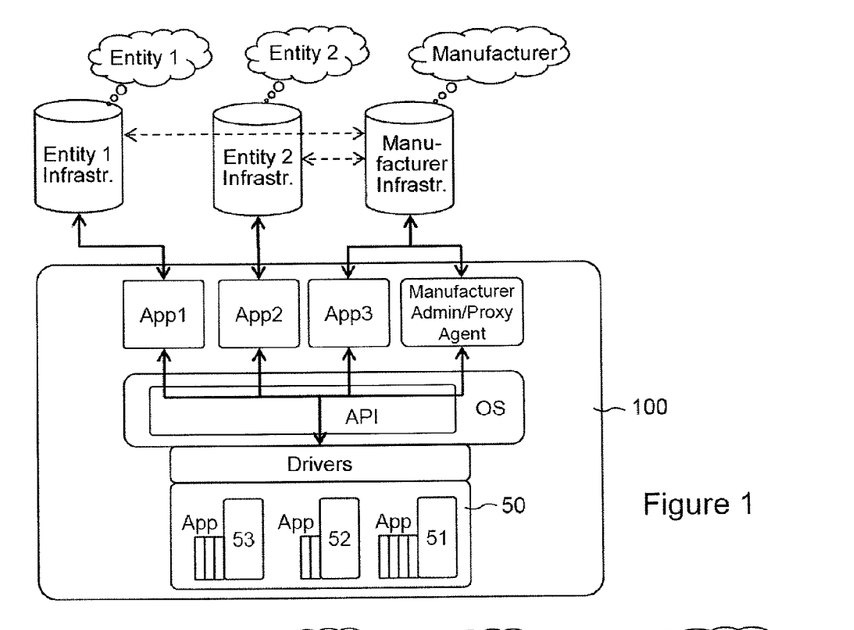
FIG. 1 illustrates a logic architecture of an eSE and a host device integrating it, according to the GlobalPlatform technology.

FIG. 1 illustrates a logic architecture of an eSE 50 and a host device 100 integrating it, according to the GlobalPlatform technology.

The eSE comprises an operating system $OS_{eSE}$, a main security domain or "issuer" 51, denoted ISD for Issuer Security Domain, and applications App accessible via the ISD 51. Other security domains 52, 53 (supplementary security domains, SSD) with a lower priority than the ISD 51 may also be provided with their applications App.

The ISD 51 is necessary within the eSE to allow administration of the secure element eSE, and in particular management of the other security domains. This for example allows the holder/owner of the ISD 51 to sublet part of the eSE or to share the control thereof with other partners, for example business partners, by installing their own security domains for them.

Since the eSE is a slave device for applications residing on the host device 100 providing an end user with services (App1, App2, App3), the GlobalPlatform technology defines the interface between these resident applications and the eSE. It in particular defines the API (Application Programming Interface) provided in the host device to access the eSE via software controllers (drivers).

Examples of applications App1, App2, App3 include mobile payment applications, transport ticketing applications, access control applications, toll payment applications, etc. It should be noted that mechanisms inside the eSE (in particular the ACF—Access Control Functions) make it possible to associate the resident applications with each security domain of the eSE.

Each security domain holds a set of encryption keys, generally at least three keys, that are used to implement secure communications with the servers of an external infrastructure that also holds those keys or corresponding keys (case of asymmetrical keys), as well as for secure content management in the eSE for those external servers, for example the management of internal keys, encryption/decryption, controlling the ADPU command sequencing, etc. to secure access to data and services internal to the eSE.

Consequently, for each security domain of the eSE, an external infrastructure or entity exists that holds the keys associated with that security domain. These external entities thus provide end users with applications to be installed on the host terminal and that will interact with the eSE to provide services.

The ISD 51 is attached to the sender or holder or owner of the eSE, i.e., generally the manufacturer of the host device 100. The SSDs are attached to the business partners of the manufacturer, i.e., Entity1 and Entity2.

To provide secure management of the eSE, the sender or holder or owner (Issuer) has an application representative within the host device. This representative is implemented by an application agent residing on the host device allowing the establishment between administration servers of the Issuer and the ISD 51 of the eSE. This application agent is referred to as an "administrator agent" or "Admin agent" according to specification "GPD_SPE_008—Secure Element Remote Application Management" and is configured to connect to one or more administration servers managed by the Issuer. It is also commonly referred to as a "Proxy agent", as it connects (proxy function) these administration servers to the issuer security domain ISD 51 of the eSE. Subsequently, reference will essentially be made to an "Admin/Proxy Agent".

BRIEF DESCRIPTION OF THE INVENTION

In order to improve the services offered for a host device, it is henceforth considered to transfer the administrative management of the eSE from the initial Issuer to another external entity that becomes the new "issuer" of the eSE, for example a local partner (within a country, a region for example) capable of providing suitable local services. This transfer of administrative management is generally done in conjunction with a transfer of ownership of the eSE.

It should be noted that there may be multiple owners of the eSE, i.e., it may be held by several external entities, in which case several respective sets of encryption keys are provided in the root security domain 51.

The administrative management of the eSE can be transferred again later. Thus, several transfers may be done on the same eSE throughout its lifetime.

The transfer of administrative management technically consists of transferring the set of encryption keys of the issuer security domain 51 to the new "Issuer" external entity. The latter generally uses the newly acquired administrator privileges to modify that set of keys. In one alternative, a new set of encryption keys is created, then loaded in the ISD 51 to replace the old set. The new set of keys is communicated to the new owner. The loading may be done by a Certificate Authority (CA) defined by GlobalPlatform that has a security domain in the eSE called CASD. As described in GlobalPlatform, the new set of keys is encrypted by the set of keys of the CASD to be sent confidentially in the eSE.

The new Issuer must then install an Admin/Proxy Agent in the host device 100 specific to it so as to access the eSE and the administrator via the ISD 51. The need to use a new Admin/Proxy Agent may for example result from protocol specificities related to the administration servers for that new Issuer.

Figure 2:
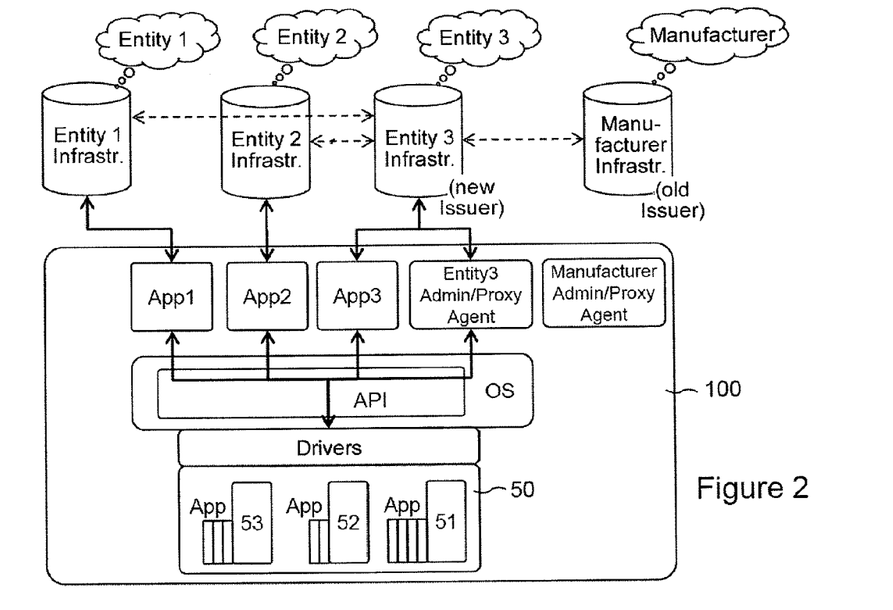
FIG. 2 illustrates the same logic architecture with administrator rights over the eSE having been transferred to a new owner.

FIG. 2 shows this context where an application App4 of the new owner has also been installed to offer end users a service specific to them. The two Admin/Proxy Agents of the former Issuer and the new Issuer thus coexist in the host device 100.

A problem arises when host device 100 is reset, either intentionally or automatically. This reset may for example be due to the sale of the host device or software problems requiring a complete reinstallation, but may also occur following a theft of the host device.

Security mechanisms must therefore be designed to prevent access to and use of the sensitive data and services of the eSE.

Figure 3:
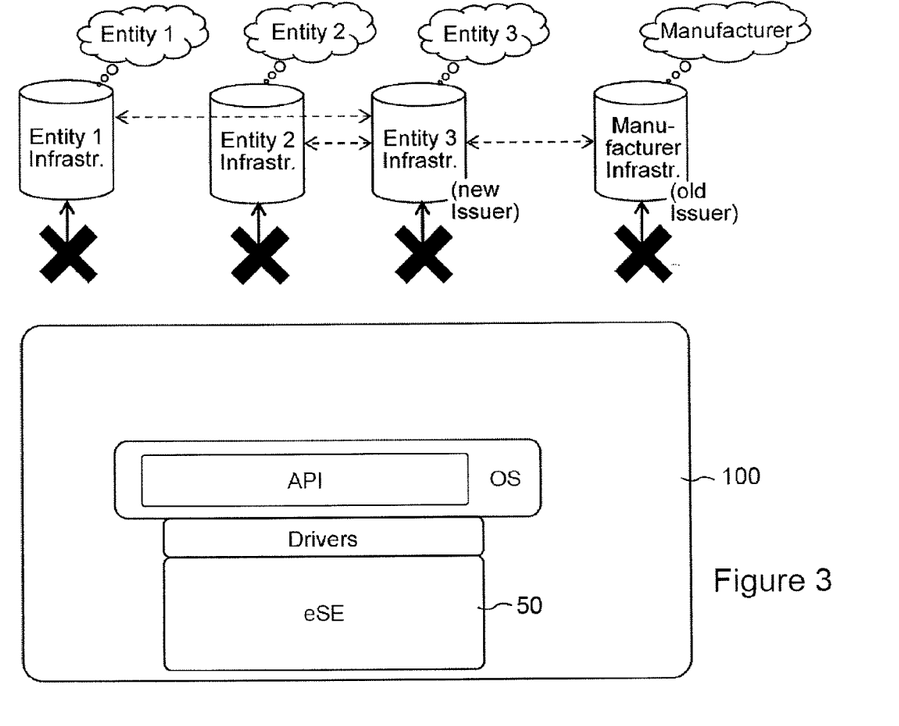
FIG. 3 illustrates a situation of that eSE and the host device of FIG. 2 following a factory reset of the latter.

However, resetting the host device leads to the deletion of all of the resident applications, with the exception of the OS. The two Admin/Proxy Agents are therefore deleted. It is therefore no longer possible to administer the eSE from the infrastructure of the new Issuer, since it will be recalled that the eSE cannot issue a connection at its own initiative. The eSE is thus made unusable, as shown by the X in FIG. 3.

The present invention thus aims to offset at least one of these drawbacks, in particular in order to secure the use of the embedded secure element when it is of the unconnected type.

In this context, a first aspect of the invention relates to a method for managing an embedded secure element (eSE) in a host device, the embedded secure element only being accessible as a slave of at least one resident application of the host device in a master-slave relationship, and the embedded secure element including an issuer security domain (ISD), with which a set of keys is associated to implement security mechanisms (set held by an external entity, the current Issuer, that is being sought), the method comprising the following steps:

sending a message including an identifier of the embedded secure element eSE, from an embedded application agent of an operating system of the host device to a first entity external to the host device and entered in the application agent;

determining a second entity external to the host device (different from the first external entity) holding the set of keys associated with the issuer security domain.

The management method according to the invention contributes to the security of the eSE inasmuch as it makes it possible to find the external entity that owns it (the current Issuer), i.e., the only one with full administrator privileges for the eSE via the ISD, despite the disappearance of its Admin/Proxy Agent within the host device. Actions on the eSE may thus be taken into account as described hereinafter, in particular if this embedded secure element proves to have been stolen.

The effectiveness of this method is in particular based on the integration of an application agent, the Admin/Proxy Agent, within the same operating system of the host device. Preferably, this is the manufacturer's application vision, since it is he who generally develops the operating system. In fact, this configuration makes it possible to keep this application agent despite the reset of the host device and use it in the process of identifying the current Issuer owing to its link to the manufacturer (the first external entity).

As described in more detail hereinafter, it is the transfer of ownership or administrator rights over the secure element information that will for example make it possible to identify the new Issuer (the second external entity). In particular, it will be possible to determine the new Issuer using one or more dedicated databases for storing the information on the transfer of ownership or registration rights for the eSE.

Correlatively, a second aspect of the invention relates to a management system for an embedded secure element (eSE) in a host device, the embedded secure element only being accessible as a slave of at least one resident application of the host device in a master-slave relationship, and the embedded secure element including an issuer security domain (ISD) with which a set of keys is associated to implement the security mechanisms, the system comprising:

an application agent embedded in an operating system of the host device and configured to send a message including an identifier of the embedded secure element eSE, to a first entity external to the host device and entered in the application agent; and the first entity (the initial Issuer) external to the host device as entered in the application agent, and configured to determine a second entity external to the host device possessing the set of keys associated with the issuer security domain.

The system has advantages similar to the inventive method.

Other features of the method and system according to embodiments are described in the dependent claims.

For example, in one embodiment, the method further comprises sending the message received from the first external entity to the second predetermined external entity; and verification, by said second external entity, that the latter holds the set of keys associated with the issuer security domain from the received message.

This arrangement offers an additional degree of security to find the current Issuer of the eSE, since the second external entity (i.e., the entity determined as the supposed current Issuer) itself verifies that it is the holder of the encryption keys using the message sent by the application agent embedded in the host device.

In one embodiment, the message is sent to the second external entity step by step, one external entity receiving the message sending it to a receiving external entity entered in a local database of the receiving external entity as the successor to the receiving external entity in the possession of the set of keys associated with said issuer security domain.

This configuration makes it possible to work up the chain of possession/ownership of the eSE from the initial Issuer (the manufacturer) to the current Issuer, without using equipment other than the infrastructure specific to each of these successive Issuers.

In another embodiment, determining a second external entity comprises:

using the first external entity to send a request to a central server to obtain an identifier of the second external entity, the request identifying the embedded secure element.

This arrangement allows direct access to the external entity supposed to be the current owner/Issuer of the embedded secure element. The verification provided using the received message makes it possible to confirm the ownership information stored in the central server. This embodiment is faster than the previous embodiment, in the case where the chain of possession/ownership of the eSE is particularly long.

In another embodiment, determining a second external entity and sending the received message to the second external entity comprise:

sending of a notification by the first external entity to a central server, said notification identifying the embedded secure element;

at the central server, locally identifying the second external entity from the identifier of the embedded secure element indicated in the notification, and sending a second notification to the second external entity as locally identified;

at the initiative of the second external entity as locally identified, establishing a connection between that second external entity and the first external entity so as to receive said message from the latter.

This arrangement makes it is possible to do away with long chains of possession/ownership and makes it possible to ease the burden of the first external entity (generally the infrastructure of the host device manufacturer) in the event many messages are received. In fact, in this embodiment, part of the loop between the first entity and the entity that is currently the owner of the embedded secure element is taken off board the central server and placed on the latter external entity.

In another embodiment, the embedded secure element (for example, the ISD) comprises, in memory, a data field to store the identifier of an external entity holding the set of keys associated with said issuer security domain, said data field being updated when the external entity possessing the set of keys changes, and the application agent recovers the external entity identifier indicated in the data field of the embedded secure element and sends that information to the first external entity such that the latter establishes a connection with the second external entity using that identifier to send it said message.

This configuration makes it possible both to eliminate the central server and the slowness that may result from a long chain of possession/ownership.

In one embodiment, the method further comprises the following steps, in the application agent embedded in the operating system of the host device:

sending the issuer security domain ISD of the embedded secure element eSE a first message generated by the application agent;

in response, receiving a message encrypted by at least one key from the set of keys associated with the issuer security domain;

in which method the messages sent to the first and second external entities include the encrypted message, and the verification by the second external entity is done from the received encrypted message and at least one key stored in the second external entity.

This arrangement offers a new additional degree of security to find the current Issuer of the eSE, because the validation by the second external entity is based on a message encrypted using an encryption key specific to the eSE.

The verification may for example consist of decrypting the received message using the key held locally to ensure that the keys corresponding to the eSE are in fact possessed. Conversely, it may consist of encrypting a known datum (that which was used at the eSE to generate the encrypted message) using the possessed key, then comparing the result to the received encrypted message.

In one embodiment, the method comprises a prior step for resetting the host device (for example leading to the erasure of all data in the host device except the operating system), and in which the step for sending of the first message to the issuer security domain by the application agent is launched upon restarting the host device following the reset.

This arrangement allows the invention to be implemented once the host device is reset, since a reset is generally done after equipment is stolen. The securing of the secure element according to the invention is therefore made as effective as possible against theft.

According to one particular feature, resetting the host device activates a reset of the embedded secure element by sending a suitable command through the operating system of the host device. In particular, the resetting of the embedded secure element comprises the automatic passage thereof into a locked state in which the functionalities of the embedded secure element are reduced.

These arrangements make it possible to secure the eSE against access to its services or the sensitive data that it stores.

According to another particular feature, the first message sent by the application agent includes a random value generated by the application agent, the encrypted message includes a cryptogram corresponding to the random value encrypted by the embedded secure element using at least one key from the set of keys associated with the issuer security domain, and the messages sent to the first and second external entities include the generated random value and the corresponding cryptogram.

This arrangement offers yet another new additional degree of security to find the current Issuer of the eSE, since it in particular makes it possible to authenticate the eSE.

According to another particular feature, the method further comprises, at the second external entity: authenticating the embedded secure element using the encrypted message and the keys in possession; and in case of unsuccessful authentication for multiple encrypted messages sent by the embedded secure element, executing at least one protective action.

This arrangement in particular aims to detect any denial of service due to the use of a fake eSE. A protective action may for example consist of adding said embedded secure element to an eSE blacklist to be excluded.

According to another particular feature, the issuer security domain comprises multiple sets of keys possessed by respective multiple external entities, and the encrypted message results from the concatenation of a datum (e.g., the random value above) encrypted by each of the sets of keys of the issuer security domain.

This configuration makes it possible to use a single piece of security information (encrypted message or cryptogram) allowing the identification of one or more co-Issuers or co-owners of the eSE.

In one embodiment, when the verification is positive (the second external entity does indeed possess the set of keys of the ISD), the second external entity sends the embedded secure element a command to modify an internal state of the embedded secure element, via the first external entity in the application agent. This arrangement makes it possible to act securely on the eSE even though the current Issuer (the second entity) does not have a unique communication channel with the eSE (its Admin or Proxy Agent having been deleted by a reset, for example).

In particular, the second external entity obtains a state of the host device, and the modification command of an internal state of the embedded secure element depends on the obtained state. For example, the command switching the eSE into a terminated state ("TERMINATED" according to GlobalPlatform) is sent when the host device is in a "stolen" or "lost" state. Conversely, the sent command switches the eSE into an unlocked state ("SECURED" according to GlobalPlatform) when the status obtained for the host device confirms that the latter has not been stolen or lost.

In one embodiment, the method comprises the following steps:

installation of a second application agent in the host device that is different from the embedded application agent, the second application agent being configured to connect to the second external entity;

deletion of the second application agent from the host device by a user; and notification of the deletion of the second application agent to the second external entity using the operating system of the host device.

Owing to this arrangement, the current Issuer is informed of the deletion of its essential application agent to administer the eSE and can therefore take appropriate measures to reestablish an operational situation, in particular by encouraging the user to reload and reinstall the application agent. Several mechanisms as described below make it possible to detect the deletion and thereby activate the deletion notification.

BRIEF DESCRIPTION OF THE FIGURES

Other features and advantages of the invention will appear in the following description, illustrated by the appended drawings, in which.

DETAILED DESCRIPTION OF THE INVENTION

Figure 4:
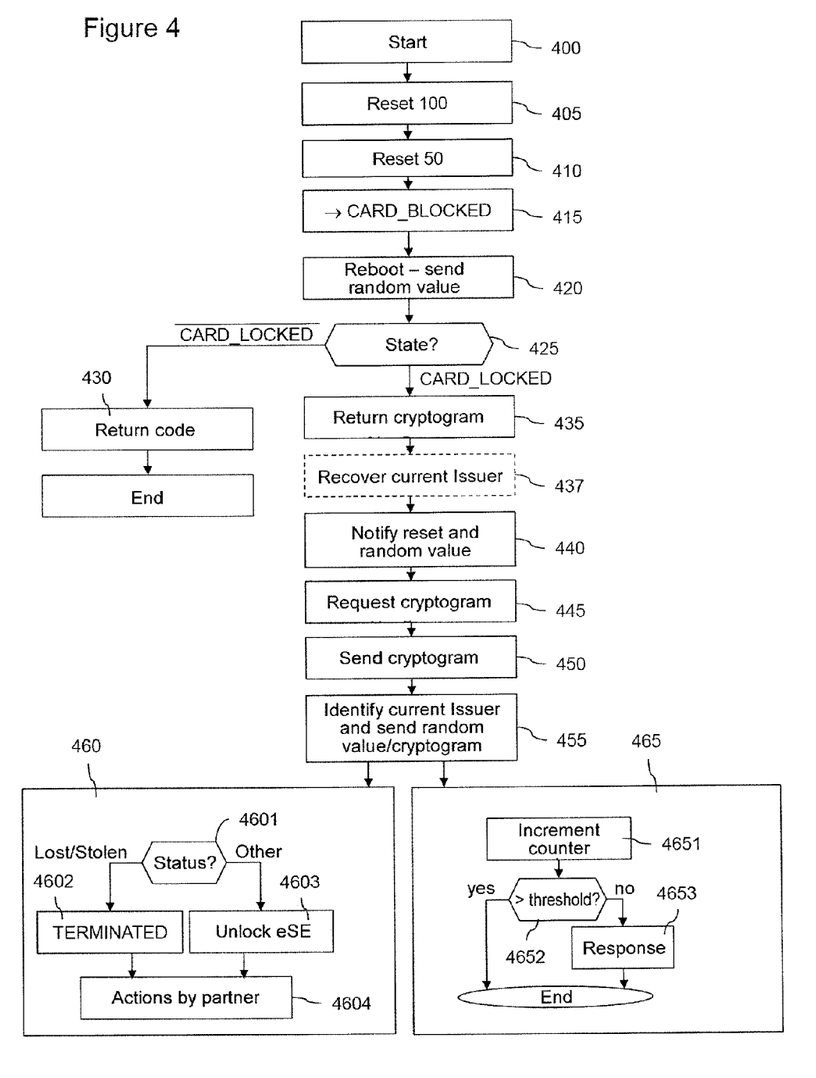
FIG. 4 shows, in the form of a flowchart, the steps of a method according to the invention when the host device is reset by a user.

FIG. 4 shows, in the form of a flowchart, the steps of a method according to the invention in an embodiment where the host device 100 is reset by a user thereof. This reset is in particular done using a function selected by the user in a sub-menu of the device.

Figure 5:
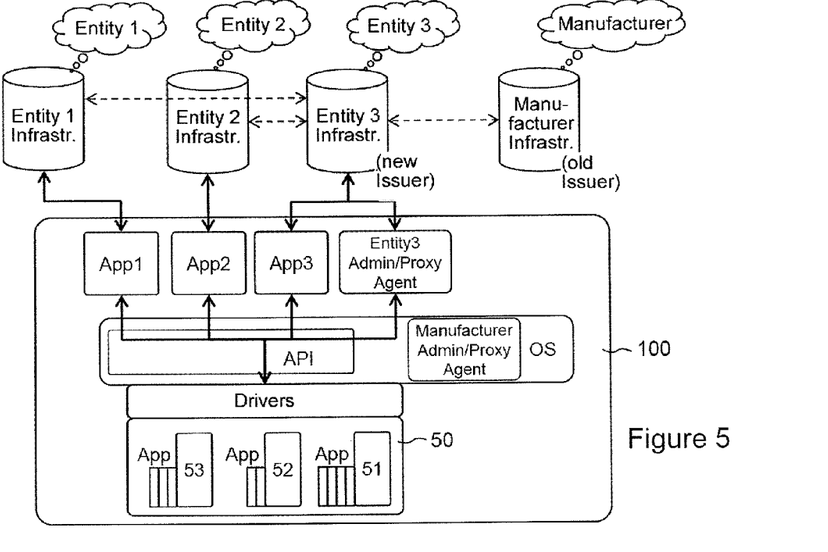
FIG. 5 illustrates a logic architecture of the eSE and the host device integrating it during the initial step of FIG. 4.

FIG. 5 illustrates a logic architecture of the embedded secure element eSE 50 and the host device 100 integrating it, after the reset.

The embedded secure element eSE is of the unconnected type, i.e., it is a slave of one or more resident applications of the host device 100.

During the manufacture of the host device 100, the initial Issuer of the eSE (the manufacturer of the host device, for example) embeds the application agent, Manufacture Admin/Proxy Agent, within the operating system OS of that host device 100.

The Manufacturer Admin/Proxy Agent is the application agent that allows its manager, here the manufacturer, to access the eSE 50 with administrator privileges. This access in particular requires possession and the user of encryption keys corresponding to the set of keys of the issuer security domain (ISD) 51 of the eSE. The administrator access for example allows equipment (servers) of the manufacturer's infrastructure to access and modify sensitive data within the eSE, create secondary security documents for business partners, etc.

During the lifetime of the eSE, applications are provided by the downloading platforms (store) of the Issuer and external entities Entity 1, Entity 2 corresponding to the partners. Applications App1, App2, App3 are thus loaded and installed on the host device 100 to provide services to the end user, with the assistance of the eSE (for secure data/services) and servers of the infrastructure of said external entities.

The applications App1, App2, App3 access the services and sensitive data of the eSE 50 through the API GlobalPlatform.

The owner or initial Issuer of the eSE 50 (manufacturer of the host device, for example) transfers its ownership and administration rights over the eSE to an external entity (new Issuer), which may also transfer its rights to another external entity, etc. These external entities may be business partners of the manufacturer. In the Figure, only the owner/current Issuer (the last to have acquired the rights) is represented by Entity 3.

Figure 7:
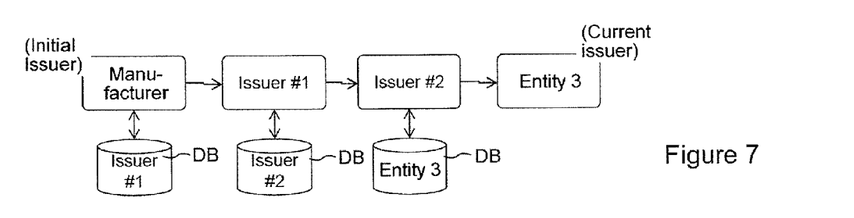
FIG. 7 illustrates the determination of the current owner of the eSE and the authentication of the eSE by the latter, according to a first embodiment.
Figure 8:
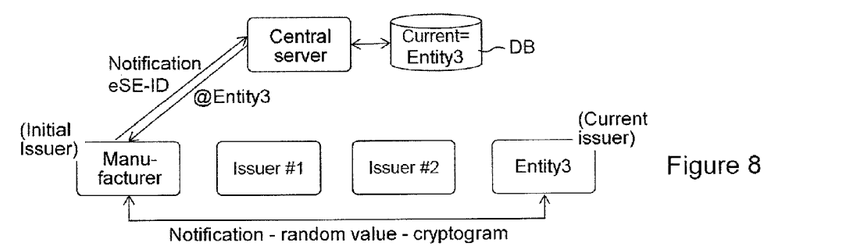
FIG. 8 illustrates the determination of the current owner of the eSE and the authentication of the eSE by the latter, according to a second embodiment.
Figure 9:
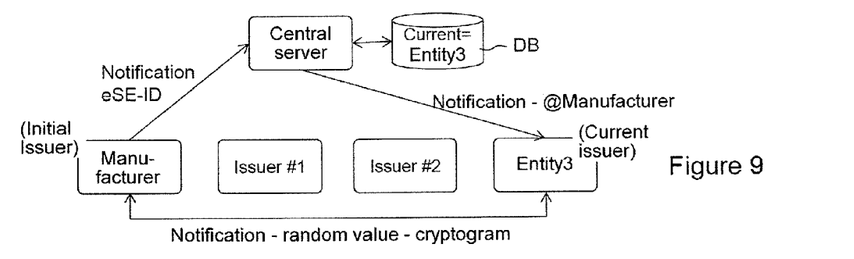
FIG. 9 illustrates the determination of the current owner of the eSE and the authentication of the eSE by the latter, according to a third embodiment.
Figure 10:
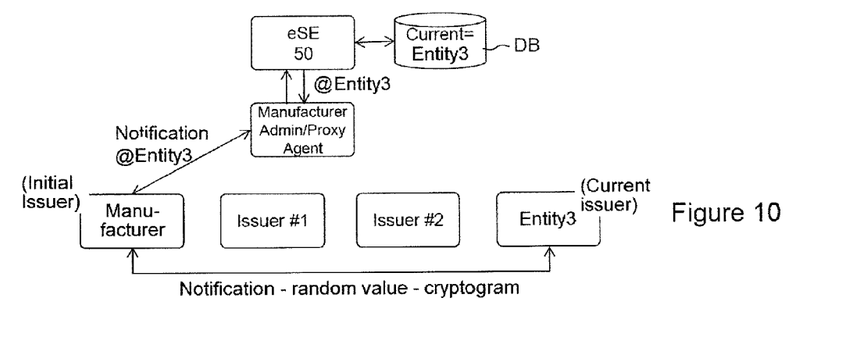
FIG. 10 illustrates the determination of the current owner of the eSE and the authentication of the eSE by the latter, according to a fourth embodiment.

Information relative to the transfer of these rights is stored so as to make it possible later, and according to the invention, to once again find the current User of the eSE 50. Various embodiments are considered as described hereinafter in reference to FIGS. 7 to 10. In particular, each Issuer that transfers its rights may enter, in a local database, the subsequent Issuer to which it transferred its it administration rights over the eSE (FIG. 7). Alternatively, a central server may be provided to which each Issuer that transfers its rights enters the identity of the new Issuer to which it transferred its administration rights over the eSE (FIGS. 8 and 9). Lastly, in another alternative, the identity of the current Issuer can be stored in a dedicated data field in the memory of the eSE. That field is therefore updated upon the transfer of administrator rights, i.e., upon each transfer of the set of keys associated with the ISD 51 (FIG. 10).

To access the eSE with its own infrastructure (its administration servers), Entity 3 loads and installs an Admin/Proxy Agent specific to it, Entity3 Admin/Proxy Agent. This application agent interacts, via a communication network of the mobile telephone network type, with the infrastructure of Entity 3 in the same way the Manufacturer Admin/Proxy Agent interacts with the manufacturer's infrastructure.

FIG. 5 corresponds to the state of the host device 100 and the eSE 50 during the initial step 400 in FIG. 4.

In step 405, the user activates a reset of the host device.

This reset results in erasing all of the data and applications loaded and installed on the host device 100, with the exception of the operating system OS, to restore the host device 100 to the state in which it left the factory. This is called a factory reset. This reset therefore comprises erasing the applications App1, App2, App2 as well as the application agent Entity3 Admin/Proxy Agent.

Figure 6:
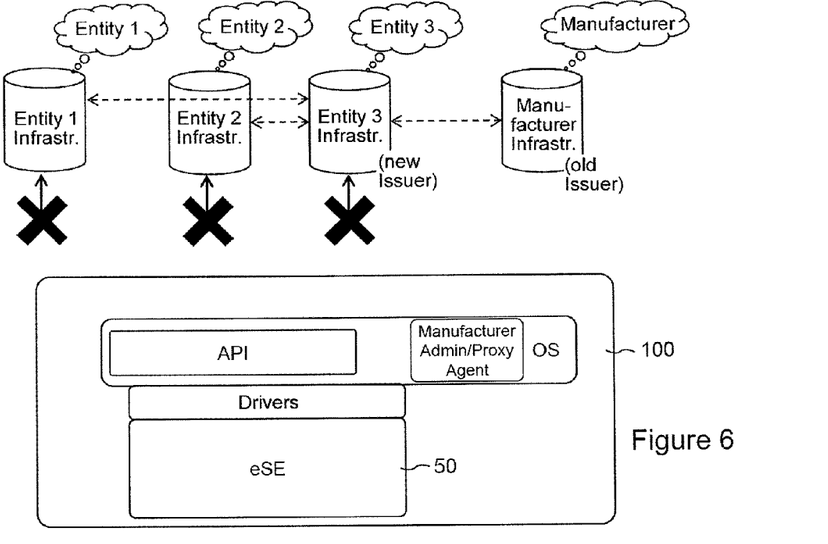
FIG. 6 illustrates that same logic architecture following a factory reset of the host device.

As shown in FIG. 6, the host device then only comprises the OS in its original state with the Manufacturer Admin/Proxy Agent and the GlobalPlatform API. The applications App and the other Admin/Proxy Agents have been deleted.

In step 410, the OS of the host device 100 sends a reset notification to the eSE 50, in response to the initialization request received from the user. This sending is done by the Manufacturer Admin/Proxy Agent to the issuer security domain 51 of the eSE. The internal ACF mechanisms of the eSE in fact always authorize the Manufacturer Admin/Proxy Agent application agent to send data/messages/notifications to the ISD 51. As a reminder, the ACF verifies that an imprint (hash) of the mobile application, here the hash of the certificate of the application agent, is indeed associated with the ISD 51, as entered in an internal database.

This notification activates the reset of the eSE 50, i.e., the erasure of all data, applications, and supplementary security domains SSD that may have been loaded, installed or created in the eSE. Only the issuer security domain ISD 51 is not erased, since it is mandatory in the eSE 50. The ISD 51 keeps the current set(s) of cryptographic keys.

This step 410 contributes to securing data contained in the eSE 50 since, by erasing it, it is no longer accessible to an ill-intentioned person.

The end of the deletion of data/applications/SSD in the eSE 50 during step 410 activates the automatic transition 415 of the eSE 50 into a locked state in which the functionalities of the eSE are reduced.

The GlobalPlatform standard in particular defines the OP_READY, INITIALIZED, SECURED, CARD_LOCKED and TERMINATED states as possible states for the eSE 50. The state of the eSE consists of storing corresponding information in a nonvolatile memory of the eSE.

Step 415 thus consists of switching the eSE from the current state (for example SECURED or OP_READY or INITIALIZED) to the CARD_LOCKED state. Section 11 of the "GlobalPlatform Card Specification 2.2.1" in particular shows the APDU commands that are no longer processed in that CARD_LOCKED state of the eSE. Access to the applications/services of the eSE, with the exception of the eSE AUDIT and eSE unlock process services, is thus locked until unlocking, if applicable.

The ISD 51 by default having the Card Lock privilege, it is able to perform that automatic switching upon detecting the reset.

Following the reset the host device 100 reboots in step 420.

In one embodiment, the method goes directly to step 440 described hereinafter, during which a message or notification containing an identifier eSE-ID of the eSE 50 is sent to the Manufacturer external entity that initially owned the eSE. In this embodiment, no random value and cryptogram are sent and used to validate the identity of the current Issuer. The Manufacturer external entity that initially owned the eSE will determine the current Issuer using the database as mentioned below in connection with FIGS. 7 to 10 (without using a cryptogram). The current Issuer thus determined may take actions against the eSE (for example, sending commands) by going through the Manufacturer external entity without any validation of the current Issuer having taken place using an encrypted message or a random value/cryptogram as described in the complete embodiment below.

In the complete embodiment as illustrated by FIG. 4, it is provided, in the boot sequence of the host device 100 for the reboot, that the application agent of the manufacturer, Manufacturer Admin/Proxy Agent, embedded in the OS, generates a random value and communicates it to the eSE 50, in particular to the ISD 51, since the ACF mechanisms allow it to do so.

This sending of the random value therefore takes place upon each reboot of the host device 100, independently of determining whether a reset thereof has taken place beforehand.

In step 425, the issuer security domain ISD 51 recovers the current state of the eSE 50 using an internal command (reading of the state information in the nonvolatile memory of the eSE) and processes the received random value differently depending on the recovered state.

If the eSE 50 is not in the CARD_LOCKED state, but in one of the OP_READY, INITIALIZED and SECURED states, in step 430 the ISD 51 returns a predefined code to the application agent Manufacturer Admin/Proxy Agent. The boot sequence can thus continue normally.

If the eSE 50 is in the CARD_LOCKED state, the ISD 51 computes a cryptogram from the received random value and the set of cryptographic keys associated with the ISD 51. It then returns the cryptogram to the requesting application agent, the Manufacturer Admin/Proxy Agent, as a response to the received random value. This is step 435 in the Figure.

If several sets of keys exist for the ISD 51, the computed cryptogram may result from the concatenation of elementary cryptograms, each computed from the random value and one of the sets of keys.

One example of a cryptogram computation consists of encrypting the random value using a key from the set of keys, for example by using an RSA (Rivest Shamir Adleman) or ECC (Elliptic Curve Cryptography) encryption mechanism.

Alternatively, step 420 may comprise sending a simple message/notification, without including a value subsequently used to compute a cryptogram. In that case, step 430 remains unchanged. However, step 435 will consist, for the eSE, of generating an encrypted message or data, for example encrypting a predetermined datum (also known by the current Issuer to allow the latter to conduct verifications as described hereinafter).

Returning to the example of the random value, upon receiving a cryptogram, therefore meaning that the eSE is in a CARD_LOCKED state, in step 440 the Manufacturer Admin/Proxy Agent application agent sends a factory reset notification to the Manufacturer external entity that was the initial owner of the eSE. More specifically, this notification is sent to a server of the manufacturer's infrastructure, denoted Manufacturer server. The notification in particular includes an identifier of the eSE 50, for example the identifier eSE-ID defined by the GlobalPlatform standard and which the application agent can recover at any time from the ISD 51.

The addressing information for this Manufacturer infrastructure, for example an IP address, an e-mail address, etc., is explicitly contained in the code (hardcoded) of the Manufacturer Admin/Proxy Agent application agent.

In a preferred embodiment, the random value generated having served as the basis for computing the cryptogram is attached in the reset notification. This arrangement makes it possible, as emerges hereinafter, to send the random value separately from the cryptogram, and thereby increase security relative to the mechanisms used by the cryptogram (in particular authentication).

In an alternative embodiment, the random value is sent with the cryptogram.

Upon receiving the notification, the Manufacturer server sends (step 445) a request to the Manufacturer Admin/Proxy Agent application agent in order to recover the corresponding cryptogram.

Which the application agent returns to it in step 450 in response to that request.

Step 455, which follows, serves to identify the current Issuer of the eSE 50 with certainty and to send it the random value and associated cryptogram.

Different embodiments of this step are now considered in reference to FIGS. 7 to 10.

In the embodiment of FIG. 7, each Issuer that transfers its administration rights over the eSE 50 enters, in a local database DB, the subsequent Issuer to which it transferred its rights. This information is stored in association with the eSE-ID.

As shown in the figure, the chain of consecutive Issuers (possession/ownership) is kept. It is thus possible to determine the current Issuer by sending, step by step, the random value and the cryptogram as far as the current Issuer. The latter is the Issuer that has not stored a subsequent Issuer in its database for the considered eSE 50 (eSE-ID). Thus, each intermediate external entity (Manufacturer, Issuer#1, Issuer#2) receiving the random value and the cryptogram sends them to a recipient external entity entered, in the local DB, as the successor to the receiving external entity in the chain of Issuers.

Practically speaking, each external entity receiving the reset notification (including the random value) and the cryptogram (starting with the Manufacturer server) determines whether a transfer of administrator rights (of the set of keys) over the eSE 50 has occurred by consulting its local DB at an entry corresponding to the eSE-ID. This consultation consists of verifying whether the identifier of another external entity is indicated in that entry.

If so, the reset notification (including the random value) and the cryptogram are sent (step 4555) to the other external entity as indicated in the local DB.

If not so, the server of the current external entity tries to decrypt the cryptogram using the set of keys that it possesses for the eSE 50 identified by the eSE-ID of the reset notification. This is step 4556.

If the decryption 4556 makes it possible to find a random value, then the eSE 50 has indeed been authenticated and the current external entity is indeed the current Issuer having administrator rights over the eSE 50. In that case, the method goes on to step 460, carried out by the current Issuer and consisting of performing specific actions.

If the decryption 4553 is negative, then the method goes on to step 465, performed by the current Issuer and for example consisting of performing security actions.

In one embodiment, step 460 first comprises a step 4601 during which the current Issuer contacts the user of the host device via a secure communication channel (for example e-mail address, mobile telephone, landline) to inquire as to the status of the device, for example "lost", "stolen", "sold", etc.

Then, depending on the obtained status, different actions may be taken.

Thus, in step 4602, if the obtained status is "lost" or "stolen", the current Issuer sends the eSE 50 a command to modify the internal state of the eSE from the "CARD_LOCKED" state to the "TERMINATED" state in which the functionalities and communication interfaces of the eSE are destroyed, the modification command being encrypted using a set of keys associated with the ISD 51 for security reasons. In fact, the security mechanisms surrounding the GlobalPlatform embedded secure elements eSE involve authenticating and encrypting all of the actions performed between such a remote external server and the ISD.

The "TERMINATED" state means that the eSE has been terminated and is an irreversible state.

The modification command may consist of a destructive action within the eSE, for example by erasing the entire memory (volatile and nonvolatile) of the eSE or destroying a fuse in the hardware layer of the eSE.

To communicate with the eSE, the current issuer sends the encrypted commands to the initial Issuer that sent the cryptogram, i.e., the Manufacturer in the example. Then it is the Manufacturer server that sends that command to the ISD 51 via the Manufacturer Admin/Proxy Agent application agent.

However, in step 4603, if the obtained status is "sold", or at the very least is not "lost" or "stolen", the current Issuer also sends the eSE 50 an encrypted command to modify the internal state of the eSE to unlock it, in particular by going from the "CARD_LOCKED" state to the "SECURED", state, which makes it possible to recover all of the functionalities of the eSE. The same transmission path of that command via the Manufacturer server and the Manufacturer Admin/Proxy Agent application agent is used.

Optionally after steps 4602 and 4603, the current Issuer can inform the other partner external entities (Entity1 and Entity2 in the example) that had information/data in the eSE 50 before the notification of the actions taken, and in particular the unlocking or destruction of the eSE. Thus, these other partner external entities can also again undertake procedures seeking to reload user data in the eSE and the host device in case of unlocking of the eSE, or put the eSE and the host device on a blacklist in case of destruction of the eSE. This is step 4604 in the Figure. This optional step is not implemented in the case of a "sold" host device.

Thus, the command to modify the state of the eSE, sent by the current Issuer, may be included in a message also comprising information specifying whether information/data must be restored in the eSE or not (if the user of the eSE has changed following a sale, for example).

Step 460 ends after sub-step 4604.

In one embodiment, step 465 (failed authentication of the eSE) comprises incrementing an authentication failure counter of the considered eSE (step 4651). A counter is therefore provided for each eSE-ID.

This counter is compared to a threshold value in step 4652 so as to detect any service denials due to the use of a fake eSE. For example, the threshold value is set at 10.

If the threshold value is not exceeded, step 465 ends.

Otherwise, a service denial is detected. Step 4653 then consists of taking protective actions in response to that service denial. For example, the eSE may be added to a blacklist distributed to the external entity so as to no longer process any message or notification associated with that eSE. Then, step 465 ends.

Figure 4A:
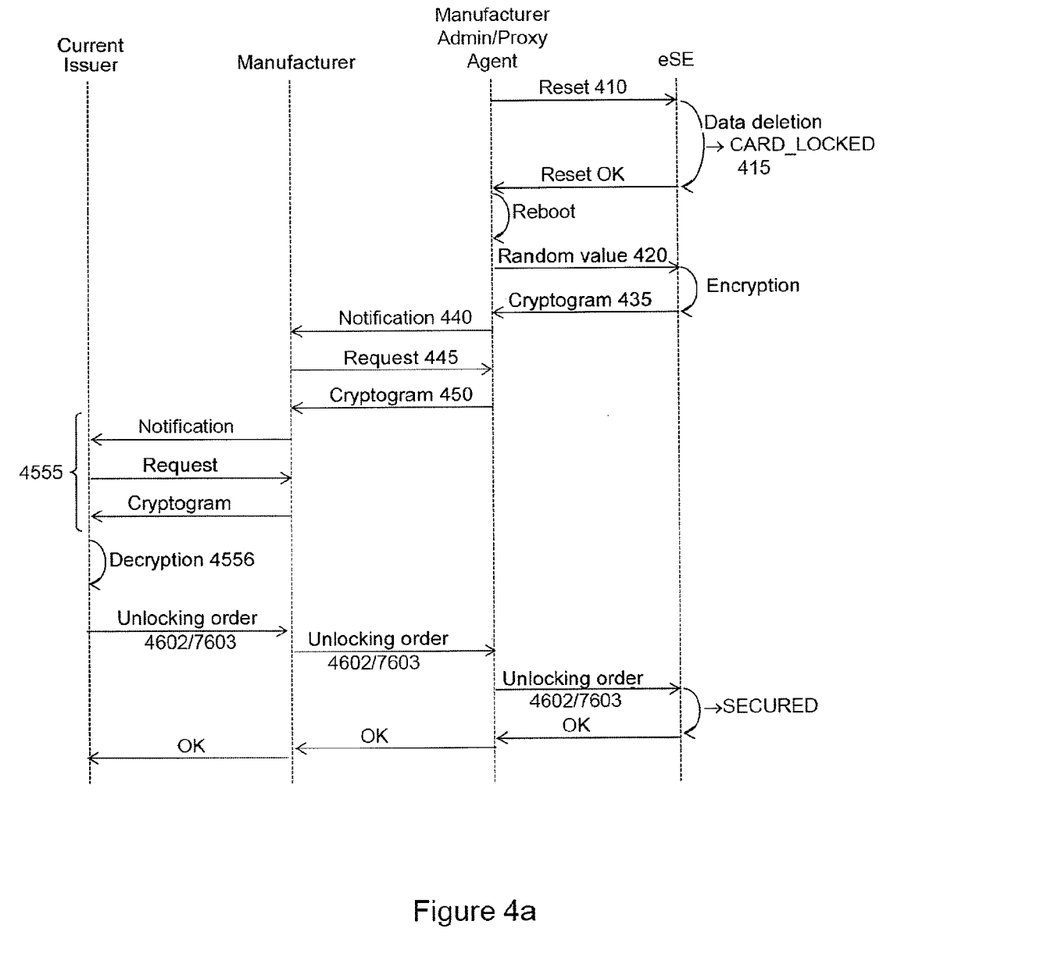
FIG. 4a illustrates the exchanges of messages between various operators implementing the steps of FIG. 4.

FIG. 4a illustrates the exchanges of messages between the various operators implemented in the steps of FIG. 4. It should be noted that these exchanges only call for unlocking of the eSE after authentication by the current Issuer.

It will be noted that step 4555 consists of a first sub-step for transmission of the reset notification (including the random value) to the current Issuer, then a second sub-step where the current Issuer requests the cryptogram from the Manufacturer server, and lastly a third sub-step during which the cryptogram is sent to the current Issuer. As indicated above, doing this makes it possible to separate the sending of the random value and cryptogram, so as to increase security relative to the use of the cryptogram (for example, for authentication).

FIG. 8 illustrates an alternative to FIG. 7. In this embodiment, a central server is provided to which each Issuer that transfers its rights communicates the identity of the new Issuer to which it transferred its administrator rights over the eSE. Thus, the central server can store, in a local database DB, the entire chain of the successive Issuers, or the very least store the most recent Issuer, i.e., the current Issuer.

It should be noted that a transfer as indicated by a former Issuer to the central server may be confirmed by the new Issuer before being stored in the DB.

In this embodiment, the identification of the current Issuer comprises sending (step 4550') a request from the Manufacturer server to the central server, in order to obtain an identifier of the current Issuer as stored in the local DB on the central server. The request in particular includes the identifier eSE-ID of the eSE 50.

In response, the central server returns (step 4551') an identifier or an address of the current Issuer as stored in the local DB.

Then, the Manufacturer server sends the reset notification (including the random value) and the cryptogram (at 4555 as previously described) to the current Issuer indicated in response (if it is different from the Manufacturer itself). Step 4556 follows for decrypting of the cryptogram by the current Issuer as previously described.

FIG. 9 illustrates another alternative of FIG. 7, still based on the central server.

In this embodiment, the identification of the current Issuer comprises sending (step 4550") of the reset notification by the Manufacturer server to the central server.

Upon receipt, the central server determines (step 4551") the current Issuer as stored in the local DB. It then contacts the current Issuer by resending it the reset notification as received, accompanied by an identifier or an address of the Manufacturer server at the origin of the notification (step 4552"), for example using an address of the current Issuer stored in the local DB.

In step 4553", the current Issuer connects to the Manufacturer server in order to recover (step 4555 previously described) the cryptogram and optionally the random value if it is not included in the reset notification. Step 4556 follows for decryption of the cryptogram by the current Issuer as previously described.

In the embodiments of FIGS. 8 and 9, the Manufacturer server can, before addressing the central server, determine that it is not itself the current Issuer. This information is easily accessible, since it consists of determining whether it itself informed the central server of any transfer of administration rights over the considered eSE. Thus, approaching the central server is avoided if no transfer has taken place.

FIG. 10 illustrates another alternative of FIG. 7. In this embodiment, the identity of the current Issuer is stored in a dedicated DB data field in the memory of the eSE upon each transfer of the administrator rights, i.e., each transfer of the set of keys associated with the ISD 51. For example, the server of the Issuer transferring its rights may send a command to update this field with an identifier of the new Issuer.

Originally, this field includes an identifier of the Manufacturer server in the example used above.

In this embodiment, the Manufacturer Admin/Proxy Agent application agent recovers this current Issuer information by approaching the ISD 51. For example, this recovery may take place during a step 437 following the step 435 described above.

In that case, the notification sent in step 440 also includes this current Issuer information.

Step 455 then consists of the Manufacturer server that received this notification directly contacting the current Issuer to send it the reset notification (including the random value) and the cryptogram (step 4555 previously described). Step 4556 follows for decryption of the cryptogram by the current Issuer as previously described.

It should be noted that during the use of the host device 100 integrating the eSE 50, the user can intentionally delete the Admin/Proxy Agent of the current Issuer. This deletion does not necessarily create a security risk on the eSE.

However, in one embodiment, it is provided that the current Issuer is notified of that deletion, either by the OS of the host device 100, or by the Admin/Proxy Agent being deleted. In one alternative, the current Issuer may be informed this deletion by a downloading platform (or a server) specific to its infrastructure, that platform periodically contacting the Admin/Proxy Agent of the eSE to ensure proper operation of that application agent. Thus, if no response is received, the platform is informed of the deletion or corruption of the Admin/Proxy Agent.

Upon detection of that deletion/corruption, the current Issuer may use a message to invite the end user to reload and reinstall the Admin/Proxy Agent.

It should also be noted that when several co-Issuers share the ISD 51, that which was explained above may be done against a first current co-Issuer, before moving on to a subsequent co-Issuer in case of failure.

In particular, all of the co-Issuers have the same rights to the ISD 51 and can therefore unlock or destroy the eSE 50. Thus, in one embodiment, when unlocking or destruction is done at the initiative of a current co-Issuer, the other current co-Issuers are notified. Alternatively, the actual unlocking or destruction of the eSE may only be done when all or a predefined portion of the co-Issuers have sent the same command to modify the state of the eSE.

At least part of the method according to the invention may be implemented using software. Thus, the present invention may assume the form of entirely software elements (including firmware, resident software, microcode, etc.) or the form of elements combining software and hardware elements.

The preceding examples are only embodiments of the invention, which is not limited thereto.

The invention claimed is:

1. A method for managing an embedded secure element, eSE, in a host device, the embedded secure element only being accessible as a slave of at least one resident application of the host device in a master-slave relationship, and the embedded secure element including an issuer security domain, ISD, with which a set of keys is associated to implement security mechanisms, the method comprising the following steps:
   sending a message including an identifier of the embedded secure element eSE, from an embedded application agent of an operating system of the host device to a first entity external to the host device and entered in the application agent;
   determining a second entity external to the host device holding the set of keys associated with the issuer security domain;
   installation of a second application agent in the host device that is different from the embedded application agent, the second application agent being configured to connect to the second external entity;
   deletion of the second application agent from the host device by a user; and
   notification of the deletion of the second application agent to the second external entity using the operating system of the host device.

2. The method according to claim 1, further comprising:
   sending the received message from the first external entity to the second predetermined external entity;
   verification by said second external entity that the latter holds the set of keys associated with the issuer security domain from the received message.

3. The method according to claim 2, wherein the message is sent to the second external entity step by step, one external entity receiving the message sending it to a receiving external entity entered in a local database of the receiving external entity as the successor to the receiving external entity in the possession of the set of keys associated with said issuer security domain.

4. The method according to claim 2, wherein determining a second external entity comprises:
   sending, by the first external entity, of a request to a central server to obtain an identifier of the second external entity, the request identifying the embedded secure element.

5. The method according to claim 2, wherein determining a second external entity and sending the received message to the second external entity comprise:
   sending a notification by the first external entity to a central server, said notification identifying the embedded secure element;
   at the central server, locally identifying the second external entity from the identifier of the embedded secure element indicated in the notification, and sending a second notification to the second external entity as locally identified;
   at the initiative of the second external entity as locally identified, establishing a connection between that second external entity and the first external entity so as to receive said message from the latter.

6. The method according to claim 2, wherein the embedded secure element comprises, in memory, a data field to store the identifier of an external entity holding the set of keys associated with said issuer security domain, said data field being updated when the external entity possessing the set of keys changes, and the application agent recovers the external entity identifier indicated in the data field of the embedded secure element and sends that information to the first external entity such that the latter establishes a connection with the second external entity using that identifier to send it said message.

7. The method according to claim 2, comprising the following steps, in the application agent embedded in the operating system of the host device:
   sending the issuer security domain ISD of the embedded secure element eSE a first message generated by the application agent;
   in response, receiving a message encrypted by at least one key from the set of keys associated with the issuer security domain;
   in which method the messages sent to the first and second external entities include the encrypted message, and the verification by the second external entity is done from the received encrypted message and at least one key stored in the second external entity.

8. A method for managing an embedded secure element, eSE, in a host device, the embedded secure element only being accessible as a slave of at least one resident application of the host device in a master-slave relationship, and the embedded secure element including an issuer security domain, ISD, with which a set of keys is associated to implement security mechanisms, the method comprising the following steps:
   sending a message including an identifier of the embedded secure element eSE, from an embedded application agent of an operating system of the host device to a first entity external to the host device and entered in the application agent;
   determining a second entity external to the host device holding the set of keys associated with the issuer security domain;
   sending the received message from the first external entity to the second predetermined external entity;
   verification by said second external entity that the latter holds the set of keys associated with the issuer security domain from the received message;
   sending the issuer security domain ISD of the embedded secure element eSE a first message generated by the application agent;
   in response, receiving a message encrypted by at least one key from the set of keys associated with the issuer security domain;
   in which method the messages sent to the first and second external entities include the encrypted message, and the verification by the second external entity is done from the received encrypted message and at least one key stored in the second external entity; and
   a prior step for resetting the host device, and in which the step for sending the first message to the issuer security domain by the application agent is launched upon restarting the host device following the reset.

9. The method according to claim 8, wherein resetting the host device activates a reset of the embedded secure element by sending a suitable command through the operating system of the host device.

10. The method according to claim 9, wherein the resetting of the embedded secure element comprises the automatic switching thereof into a locked state in which the functionalities of the embedded secure element are reduced.

11. The method according to claim 7, wherein the first message sent by the application agent includes a random value generated by the application agent, the encrypted message includes a cryptogram corresponding to the random value encrypted by the embedded secure element using at least one key from the set of keys associated with the issuer security domain, and the messages sent to the first and second external entities include the generated random value and the corresponding cryptogram.

12. The method according to claim 7, further comprising, at the second external entity:
authenticating the embedded secure element using the encrypted message and the keys in possession; and in case of unsuccessful authentication for multiple encrypted messages sent by the embedded secure element, executing at least one protective action.

13. The method according to claim 7, wherein the issuer security domain comprises multiple sets of keys possessed by respective multiple external entities, and the encrypted message results from the concatenation of a datum encrypted by each of the sets of keys of the issuer security domain.

14. The method according to claim 2, wherein, when the verification is positive, the second external entity sends the embedded secure element a command to modify an internal state of the embedded secure element, via the first external entity in the application agent.

15. The method according to claim 14, wherein the second external entity obtains a status of the host device, and the modification command of an internal state of the embedded secure element depends on the obtained state.

16. A management system for an embedded secure element, eSE, in a host device, the embedded secure element only being accessible as a slave of at least one resident application of the host device in a master-slave relationship, and the embedded secure element including an issuer security domain, ISD, with which a set of keys is associated to implement the security mechanisms, the system comprising:
an application agent embedded in an operating system of the host device and configured to send a message including an identifier of the embedded secure element eSE, from an embedded application agent of an operating system of the host device to a first entity external to the host device and entered in the application agent; and
the first entity external to the host device as entered in the application agent, and configured to determine a second entity external to the host device possessing the set of keys associated with the issuer security domain;
a second application agent installed in the host device that is different from the embedded application agent, the second application agent being configured to connect to the second external entity;
the systems being configured for deletion of the second application agent from the host device by a user; and
the systems being configured for notification of the deletion of the second application agent to the second external entity using the operating system of the host device.

17. The method according to claim 3, comprising the following steps, in the application agent embedded in the operating system of the host device:
sending the issuer security domain ISD of the embedded secure element eSE a first message generated by the application agent;
in response, receiving a message encrypted by at least one key from the set of keys associated with the issuer security domain;
in which method the messages sent to the first and second external entities include the encrypted message, and the verification by the second external entity is done from the received encrypted message and at least one key stored in the second external entity.

18. The method according to claim 4, comprising the following steps, in the application agent embedded in the operating system of the host device:
sending the issuer security domain ISD of the embedded secure element eSE a first message generated by the application agent;
in response, receiving a message encrypted by at least one key from the set of keys associated with the issuer security domain;
in which method the messages sent to the first and second external entities include the encrypted message, and the verification by the second external entity is done from the received encrypted message and at least one key stored in the second external entity.

* * * * *